May 8, 1962     J. F. QUAAS     3,033,977
TUBULAR WELDING ROD
Filed Aug. 21, 1959
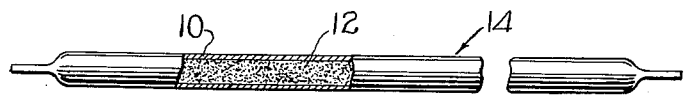
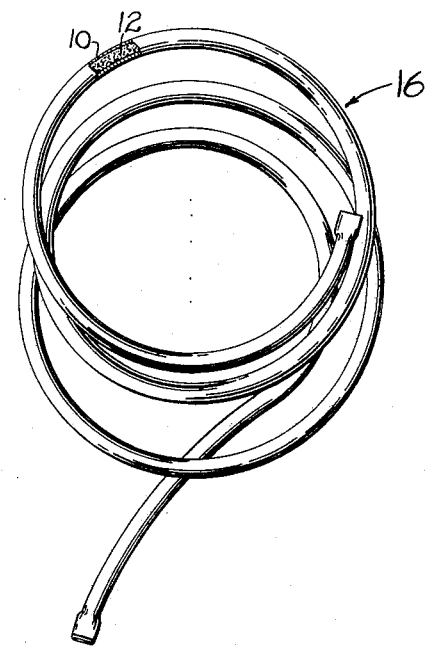
INVENTOR
Joseph F. Quaas
BY Connolly and Hutz
ATTORNEYS 3,033,977
TUBULAR WELDING ROD
Joseph F. Quaas, Island Park, N.Y., assignor to Eutectic Welding Alloys Corporation, Flushing, N.Y., a corporation of New York
Filed Aug. 21, 1959, Ser. No. 835,270
17 Claims. (Cl. 219—146)

This invention relates to a rod for efficiently depositing an alloy system whose ultimate properties are metallurgically desirable but unfavorable for deposition; and more particularly relates to such a rod for depositing an alloy having relatively high nickel-chromium content.

Various alloys are extremely useful for welding type of service such as in brazing, facing and soldering as well as true welding. However, some of these alloys, such as those with high nickel-chrome contents are unfortunately difficult to fabricate and apply because of either or all of many undesirable properties, such as extreme hardness, toughness or brittleness (sometimes accentuated by working in fabrication) and unfavorable current-carrying characteristics. Attempts have been made, such as those described in U.S. Letters Patent No. 2,408,620, to avoid the difficulty of fabricating rods of the aforementioned type by coating a mild steel core with a thick flux coating incorporating powdered chromium and nickel. However, this limits the constitution of the fluxing ingredients and binder because conventional ingredients are highly reactive with metallics causing either premature hardening to interfere with extrusion or being susceptible to spontaneous combustion and even explosion. Furthermore, as a practical matter, the percentage of metallics in a flux coating can only be increased to approximately 40% by weight of the coating which severely limits the freedom of variation and incorporation of these metallics. These limitations are accentuated by the necessity described in the aforementioned patent of excluding nickel and chromium from the core to improve its current-carrying an arc welding characteristics.

An object of this invention is accordingly to provide a welding rod, which incorporates constituents whose ultimate deposit has desirable metallurgical properties in a form which avoids any properties of the ultimate alloy which might interfere with fabrication and utilization of this welding rod.

Another object is to provide a convenient welding rod of this type which efficiently deposits an alloy system with a relatively high nickel-chromium content.

In accordance with this invention, a rod is made to incorporate a relatively small diameter metal tube packed with a metallic powder. The metal of the tube is ductile to facilitate its fabrication, and the tube metal reacts upon deposition together with the inserted metallic powder to provide an alloy system having desirable joining and/or facing properties. This avoids any properties of the ultimate combination which might have interfered with fabrication and utilization of this alloy system in the rod. Furthermore, even though the conductive properties of the tube metal as well as those of ultimate composition might have slowed or otherwise interfered with their deposition rate, the utilization of such metals in relatively small diameter tubes permits relatively high current densities to be used in arc welding to favorably increase the deposition rate. A particularly useful form of this invention employs a substantial nickel content in the tube and a substantial chromium content in the inserted metallic powder.

More specifically in accordance with this invention, a welding rod is formed of a small diameter tube of a stainless steel composition having a chromium content ranging from 18 to 21 parts by weight and a nickel content ranging from 9 to 11 parts by weight. Such an alloy is ductile and readily formed. A metal powder having a high chromium content such as pure chromium powder or ferrochromium powder is inserted within the tube. From 10 to 20 parts by weight of metal powder may be associated with 80 to 90 parts by weight of the stainless steel composition. Another favorable range consists of from 10 to 15% by weight of powder associated with 85 to 90% by weight of tube metal. When this rod is used for joining various materials such as those of the ferrous type, it provides a deposit having an unexpectedly well-developed austenitic-ferrite structure which has extremely high tensile strength together with excellent ductility, and remarkably great crack resistivity. Furthermore, its rate of deposition is quite rapid because of the ability of the rod to operate under high current densities, for example, ranging from 200 to 300 amperes.

A welding rod capable of depositing nickel-chromium-silicon-boron type alloys may also be accordingly made by inserting chromium, silicon and boron powders within a small diameter tube formed of nickel. This rod has highly beneficial deposited alloy properties without the hardness and brittleness of cast rods which were the only heretofore available source of these compositions.

Novel features and advantages of the present invention will become apparent to one skilled in the art from a reading of the following description in conjunction with the accompanying drawing wherein similar reference characters refer to similar parts and in which:

FIG. 1 is a perspective view of one embodiment of this invention; and

FIG. 2 is a perspective view of the embodiment shown in FIG. 1 in coil form.

A particular example of this invention is formed in the following manner. A stainless steel tube is made of the following composition utilizing the preferred example.

| Constituent | Proportional Range | Preferred Example |
|---|---|---|
| Carbon | .04/.15 | 0.03 |
| Chromium | 18.0 to 21.00 | 20.00 |
| Nickel | 9.0 to 11.0 | 9.50 |
| Manganese | .50/4.75 | 1.75 |
| Silicon | .20/0.90 | 0.45 |
| Phosphorus | .01/0.04 | 0.02 |
| Sulfur | .01/0.03 | 0.02 |
| Iron | Balance | Balance |

This composition is, for example, formed into a strip .020 inch in thickness which is rolled to form the tube 10 shown in FIG. 1 having a mean diameter of 3/32 inch. This tube is filled with commercially pure chromium powder 12 of 100 mesh size with 10 to 20 parts by weight of powder being used with 80 to 90 parts by weight of tube material. This rod 14 is used, for example, to join ferrous materials and the deposit has an extremely high tensile strength ranging, for example, to 120,000 p.s.i. with an excellent ductility of 30% elongation and remarkably great crack resistivity.

The powder inserted within the tube may be another chromium-containing composition such as ferrochromium powder of the aforementioned mesh size with an iron content ranging, for example, from 20 to 40 parts by weight of the powder composition. Any of the welding compositions of this invention are extremely useful for joining a wide variety of base metals such as mild steel, low alloy steel, medium carbon steel, free machining steel, manganese steel such as the Hadfield steel, a wide variety of stainless alloys and cast iron.

Various fluxes may be incorporated with the inserted powder; however, this is not necessary, as the rod may be used without a flux under some circumstances. These rods may be used in conjunction with automatic or semi-automatic welding processes and can also be deposited by either the open arc or the submerged arc processes.

Flux can be fed through a hopper together with the alloy wire and, furthermore, this rod can be deposited by an inert arc process in which inert gases such as argon, helium and mixtures thereof are used as protective blankets in the arc.

The ultimate tubular rod may be drawn through a finishing die to compact it and make it uniform in content. An example of a tube formed in this manner will initially utilize a strip of stainless which is, for example, .020 inch thick with an initial tubular outside diameter of ⅛ inch. After being drawn through the finishing die, the tube will have an outside diameter of approximately %₂ inch and incorporate a powder content which is 15% by weight of the associated tubular material. As shown in FIG. 2 this formed tube 16 may then be coiled and cut into specific weights.

Although it is realized that the deposited alloy incorporates a chromium content somewhat higher than that of the tube material, it is not completely understood why the deposit is superior to direct use of the ultimate composition for joining. However, it is suspected that the superior properties of a rod formed in the manner described herein are a result of its rapid depositing characteristics and the balanced metallurgical structure of its deposit. The deposited metal will consist of a chrome/nickel ratio of at least 3 to 1. This chemistry provides a deposited structure with at least 15% ferrite and 85% austenite. Metallurgically, this structure enhances the physical properties and crack resistivity of the deposit.

Another aspect of this invention is the creation of hard facing and joining alloys prepared in tubular form utilizing nickel-chromium-silicon-boron type materials. Such alloys, heretofore, have been available only in cast form. An example of this form of this invention utilizes a flat strip of pure or Grade A nickel material .015 to .020 inch in thickness formed into a tubular rod 3/32″ in diameter and filled with an alloy powder content of 100 mesh size which will deposit weld metal with advantageous properties. Prior to ultimate closure of the strip of nickel, 20 to 30 parts by weight of chromium, 3 to 10 parts by weight of silicon, and 2 to 10 parts by weight of boron are encapsulated within the tubular formed structure. Final closure of the tube and its eventual draw through a sizing die provides a highly ductile welding rod and not one which is hard and brittle such as a cast rod of the same chemistry would be. This particularly example of the invention will deposit weld metal containing 60 to 70% nickel, 15 to 25% chromium, 2 to 10% silicon and 1.5 to 8% boron by weight. A particularly effective example of this invention includes 25 parts of chromium, 5 parts by weight of silicon and 6 parts by weight of boron.

Alloys which previously were only supplied as a casting can now be provided in a form which makes them both highly ductile and workable and capable of unexpectedly rapid and easy deposition. Stainless alloys consisting of high percentages of chromium, particularly those which work-harden rapidly during forming operations, increase the cost to the consumer. This invention circumvents these difficulties as well as the characteristic difficulty of these alloys to deposit rapidly. Stainless alloys containing boron as well as nickel base alloys containing boron and/or silicon are also most difficult to work in respect to forming, rolling and drawing operations and are difficult to deposit rapidly. With the idea provided by this invention, these alloys can now be manufactured in a ductile coil form for automatic and semi-automatic welding operations which can be deposited with remarkable ease and high speed.

What is claimed is:

1. A welding rod comprising a metal tube having a relatively small diameter relative to its length, a metallic powder inserted within said tube, the metal of said tube incorporating a substantial nickel content of at least 9% by weight to make it ductile to facilitate fabrication in relatively small diameters and electrically conductive, the composition of said metal tube and said metallic powder reacting with each other upon deposition to provide an alloy system having favorable metallurgical properties whereas any undesirable properties of the ultimate deposition are avoided by maintaining the powder uncombined with the tube material prior to deposition, and said metallic powder incorporating a chromium content 20-100% by weight to enhance the tensile strength, ductility and crack resistance of the deposited weld without interfering with the ductility and conductivity of said tube.

2. A welding rod as set forth in claim 1 wherein the thickness of the wall of said metal tube ranges from 0.015 to 0.020 inch.

3. A welding rod as set forth in claim 1 wherein 10 to 20 parts by weight of said metallic powder are associated with 80 to 90 parts by weight of said tube metal.

4. A welding rod as set forth in claim 1 wherein said metallic powder consists essentially of chromium powder.

5. A welding rod as set forth in claim 1 wherein said metallic powder consists essentially of ferrochromium powder.

6. A welding rod as set forth in claim 1 wherein said metallic powder also incorporates a minor amount of silicon and boron.

7. A welding rod as set forth in claim 6 wherein said powder consists essentially of 20 to 30 parts by weight of chromium, 3 to 10 parts by weight of silicon and 2 to 10 parts by weight of boron.

8. A welding rod as set forth in claim 1 wherein said metallic powder is approximately of 100 mesh size.

9. A welding rod as set forth in claim 1 wherein said tube is formed of a material consisting essentially in parts by weight of the following formulation:

| Constituent: | Proportional range |
|---|---|
| Carbon | 0.08 |
| Chromium | 18.0 to 21.00 |
| Nickel | 9.0 to 11.00 |
| Manganese | 2.50 |
| Silicon | 0.90 |
| Phosphorus | 0.04 |
| Sulfur | 0.03 |
| Iron | Balance |

10. A welding rod as set forth in claim 9 wherein said tube composition consists essentially in parts by weight of the following formulation:

| Constituent: | Preferred example |
|---|---|
| Carbon | 0.03 |
| Chromium | 20.00 |
| Nickel | 9.50 |
| Manganese | 1.75 |
| Silicon | 0.45 |
| Phosphorus | 0.02 |
| Sulfur | 0.02 | and 15 percent by weight of metal powder being associated with 85 percent by weight of tube material.

11. A welding rod as set forth in claim 9 wherein said metal powder is chromium powder.

12. A welding rod as set forth in claim 9 wherein said rod has a wall thickness ranging from 0.010 to .025 inch.

13. A welding rod as set forth in claim 1 wherein said tube is formed of a stainless steel composition consisting essentially in parts by weight of 18 to 21 of chromium and 9 to 11 of nickel.

14. A welding rod as set forth in claim 13 wherein steel 10 to 20 parts by weight of metal powder are associated with 80 to 90 parts by weight of said stainless steel composition.

15. A welding rod as set forth in claim 13 wherein from 10 to 15% by weight of said powder are associated with 85 to 90% by weight of tube metal.

16. A welding rod as set forth in claim 1 wherein said tube metal consist essentially of nickel, said metallic powder is approximately of 100 mesh size and consists essentially of 20 to 30 parts by weight of chromium, 3 to 10 parts by weight of silicon and 2 to 10 parts by weight of boron.

17. A welding rod as set forth in claim 16, wherein said nickel is initially formed from a sheet ranging from 0.015 to 0.020 inch in thickness, and the finally closed tube is highly ductile by virtue of being drawn through a sizing die.

References Cited in the file of this patent

UNITED STATES PATENTS

| | | |
|---|---|---|
| 2,016,585 | Basore et al. | Oct. 8, 1935 |
| 2,137,471 | Zublin | Nov. 22, 1938 |
| 2,219,462 | Wissler | Oct. 29, 1940 |
| 2,442,087 | Kennedy | May 25, 1948 |
| 2,944,142 | Sjoman | July 5, 1960 |

FOREIGN PATENTS

| | | |
|---|---|---|
| 513,045 | Great Britain | Dec. 20, 1937 |

UNITED STATES PATENT OFFICE
CERTIFICATE OF CORRECTION

Patent No. 3,033,977                             May 8, 1962

Joseph F. Quaas

It is hereby certified that error appears in the above numbered patent requiring correction and that the said Letters Patent should read as corrected below.

Column 1, line 39, for "an" read -- and --; column 4, line 68, strike out "steel".

Signed and sealed this 11th day of September 1962.

(SEAL)
Attest:

ERNEST W. SWIDER                                        DAVID L. LADD
Attesting Officer                                            Commissioner of Patents